(12) United States Patent
Tajima et al.

(10) Patent No.: US 6,615,867 B2
(45) Date of Patent: Sep. 9, 2003

(54) SPACER TYPE PRESSURE REDUCING VALVE

(75) Inventors: Masamichi Tajima, Tsukuba-gun (JP); Hiroyuki Katsuta, Tsukuba-gun (JP)

(73) Assignee: SMC Corporation, Tokyo (JP)

(*) Notice: Subject to any disclaimer, the term of this patent is extended or adjusted under 35 U.S.C. 154(b) by 0 days.

(21) Appl. No.: 10/033,780

(22) Filed: Jan. 3, 2002

(65) Prior Publication Data

US 2002/0100512 A1 Aug. 1, 2002

(30) Foreign Application Priority Data

Jan. 30, 2001 (JP) .................................. 2001-022003

(51) Int. Cl.[7] ............................................... F15B 13/04
(52) U.S. Cl. ...................... 137/596; 137/116.5; 137/884
(58) Field of Search ............................. 137/116.5, 596, 137/884

(56) References Cited

U.S. PATENT DOCUMENTS

| 5,829,481 A | 11/1998 | Tajima et al. |
| 5,988,214 A | 11/1999 | Tajima et al. |
| 6,012,490 A | 1/2000 | Tajima et al. |

FOREIGN PATENT DOCUMENTS

| JP | 10-096404 | 4/1998 |
| JP | 10-133744 | 5/1998 |
| JP | 10-283037 | 10/1998 |

*Primary Examiner*—Gerald A. Michalsky
(74) *Attorney, Agent, or Firm*—Oblon, Spivak, McClelland, Maier & Neustadt, P.C.

(57) ABSTRACT

A spacer type pressure reducing valve for adjusting a fluid pressure is mounted between a solenoid valve, which switches a flowing direction of pressurized fluid, and a base, which supplies pressurized fluid to the solenoid valve. First and second pressure-reducing portions are integrally accommodated in a valve body of the spacer type pressure reducing valve. The spacer type pressure reducing valve is compact and is capable of adjusting pressure in two output ports.

8 Claims, 6 Drawing Sheets

SPACER TYPE PRESSURE REDUCING VALVE

TECHNICAL FIELD TO WHICH THE INVENTION BELONGS

The present invention relates to a spacer type pressure reducing valve mounted between a switching valve which switches a direction of flow of pressurized fluid and a base which supplies pressurized fluid to the switching valve, for adjusting fluid pressures out put to a pair of output ports to required pressures.

PRIOR ART

When a fluid pressure device is actuated by pressurized fluid such as compressed air supplied through a switching valve, it is desired to adjust fluid pressure to be supplied to the fluid pressure device depending upon a set pressure or actuating state of the device.

In such a case, a pressure reducing valve that is a pressure-adjusting valve is usually mounted in a pipe that connects an output port of the switching valve and the fluid pressure device.

However, since a known pressure reducing valve is large in size in generally, if the pressure reducing valve is connected to the switching valve by piping, there are problem that its piping operation is extremely troublesome and large installation space is required.

Especially this problem is prone to be generated when a plurality of switching valves are mounted on a base such as a manifold or sub-plate having a piping port and are used. It is difficult, in some cases, to mount the pressure reducing valve depending upon the number of switching valves to be used.

Thereupon, in order to solve the above problems, there is proposed a spacer type pressure reducing valve that is directly sandwiched and mounted between the switching valve and the base (Japanese Publication Nos. 10-96404, 10-133744 and 10-283037).

This spacer type pressure reducing valve comprises a valve body having substantially the same lateral width as that of the switching valve, a plurality of communication passages which bring communication holes of the switching valve and the base into communication with each other in the valve body, a pressure-adjusting valve hole provided cutting across the communication passages, a pressure-adjusting valve rod inserted in the pressure-adjusting valve hole, and means for adjusting air pressure to a set pressure by cooperation of the pressure-adjusting valve rod. When adjusting pressures in two output ports that are in communication with the fluid pressure device, two spacer type pressure reducing valves are superposed on each other.

In the above spacer type pressure reducing valve, when the pressures in two output ports are adjusted, since it is necessary to superpose and use the two spacer type pressure reducing valves, there are problems that a pressure-reducing portion becomes large in size and the large installation space is required.

DISCLOSURE OF THE INVENTION

The present invention has been accomplished in view of the problems, and it is an object of the invention to provide a compact spacer type pressure reducing valve capable of adjusting pressures in two output ports.

The above and other object and novel features of the present invention will be apparent from description of this specification and accompanying drawings.

To achieve the above object, a spacer type pressure reducing valve of the invention which is disposed between a switching which adjusts an output fluid pressure and which is disposed between a switching valve having one supply communication hole, two output communication holes and a discharge communication hole and a base having a plurality of communication holes corresponding to the above communication holes, wherein this spacer type pressure reducing valve comprises a valve body sandwiched between the switching valve and the base; two pressure-adjusting valve holes formed in the valve body in parallel to each other, and two pressure-adjusting valve rods movably accommodated in the pressure-adjusting valve holes; one supply communication passage for connecting supply communication holes in the valve body corresponding to the switching valve and the base, and two output communication passages for connecting the corresponding output communication holes, and two discharge communication passages for connecting corresponding discharge communication holes; a pressure-adjusting valve seat and a pressure-adjusting valve body formed in one of the pressure-adjusting valve holes and a pressure-adjusting valve rod therein for adjusting the fluid pressure output from one of the output communication passages, and another pressure-adjusting valve seat and another pressure-adjusting valve body formed in the other pressure-adjusting valve hole and a pressure-adjusting valve rod therein for adjusting fluid pressure output from the other output communication passage; pressure-adjusting chambers respectively provided on one ends of the two pressure-adjusting valve rods, and returning chambers respectively provided on the other ends of the pressure-adjusting valve rods; pressure-adjusting pistons slidably provided in the pressure-adjusting chambers; pressure-adjusting springs for biasing the pressure-adjusting pistons toward the pressure-adjusting valve rods; returning springs respectively provided in the returning chambers for biasing the pressure-adjusting valve rods toward the pressure-adjusting pistons; a communication flow-passage for connecting the pressure-adjusting chamber and the returning chamber on the opposite ends of the one output communication passage and the one pressure-adjusting valve rod, and a communication flow-passage for connecting the pressure-adjusting chamber and the returning chamber on the opposite ends of the other output communication passage and the other pressure-adjusting valve rod.

According to the present invention, said pressure-adjusting piston includes a discharge hole for discharging out the pressurized fluid in the pressure-adjusting chamber, and the pressure-adjusting valve rod is provided at its end with an opening/closing portion for opening and closing the discharge hole.

Moreover, said valve body is provided at its end closer to the pressure-adjusting chamber with two adjusting screws capable of independently adjusting resilient forces of the two pressure-adjusting springs, and two pressure gauges for independently detecting fluid pressures of the two pressure-adjusting chambers.

Further, said communication flow-passage comprises a pressure-adjusting passage formed in the pressure-adjusting valve rod and brought into communication with the returning chamber, a pressure-introducing gap formed between the pressure-adjusting valve hole and the pressure-adjusting valve rod for connecting the pressure-adjusting passage and the pressure-adjusting chamber, and a pressure intake hole for bringing the returning chamber or the pressure-adjusting passage and the output communication passage.

According to one concrete embodiment of the present invention, said supply communication passage in the valve body extends through portions of the two pressure-adjusting valve holes, the pressure-adjusting valve seats are formed on positions through which the supply communication passages of the pressure-adjusting valve holes pass.

According to the other concrete embodiments of the present invention, the two output communication passages in the valve body respectively extend through the two pressure-adjusting valve holes, the pressure-adjusting valve seats are formed on positions through which the output communication passages of the pressure-adjusting valve holes pass.

According to the present invention, in the spacer type pressure reducing valve, since the two pressure-reducing portions are integrally disposed in the valve body, the structure can be made compact and the size thereof can be reduced.

Further, since the pressure gauge is disposed in the vicinity of the adjusting screw, the operability of the pressure setting of the pressurized fluid is enhanced.

BRIEF DESCRIPTION OF THE DRAWING

In FIG. 3, (a) is a sectional view taken along arrows IIIa—IIIa in FIG. 2, (b) is a sectional view taken along arrows IIIb—IIIb in FIG. 2, (c) is a sectional view taken along arrows IIIc—IIIc in FIG. 2, (d) is a sectional view taken along arrows IIId—IIId in FIG. 2, (e) is a sectional view taken along arrows IIIe—IIIe in FIG. 2, and (f) is a sectional view taken along arrows IIIf—IIIf in FIG. 2.

In FIG. 6, (a) is a sectional view taken along arrows VIa—VIa in FIG. 5, (b) is a sectional view taken along arrows VIb—VIb in FIG. 5, (c) is a sectional view taken along arrows VIc—VIc in FIG. 5, (d) is a sectional view taken along arrows VId—VId in FIG. 5, (e) is a sectional view taken along arrows VIe—VIe in FIG. 5, (f) is a sectional view taken along arrows VIf—VIf in FIG. 5 and (g) is a sectional view taken along arrows VIg—VIg in FIG. 5.

DETAILED DESCREPTION

Embodiments of the present invention will be explained based on the drawings below. In the explanation of the embodiments, elements having the same functions are designated with the same symbols.

Figure 1:
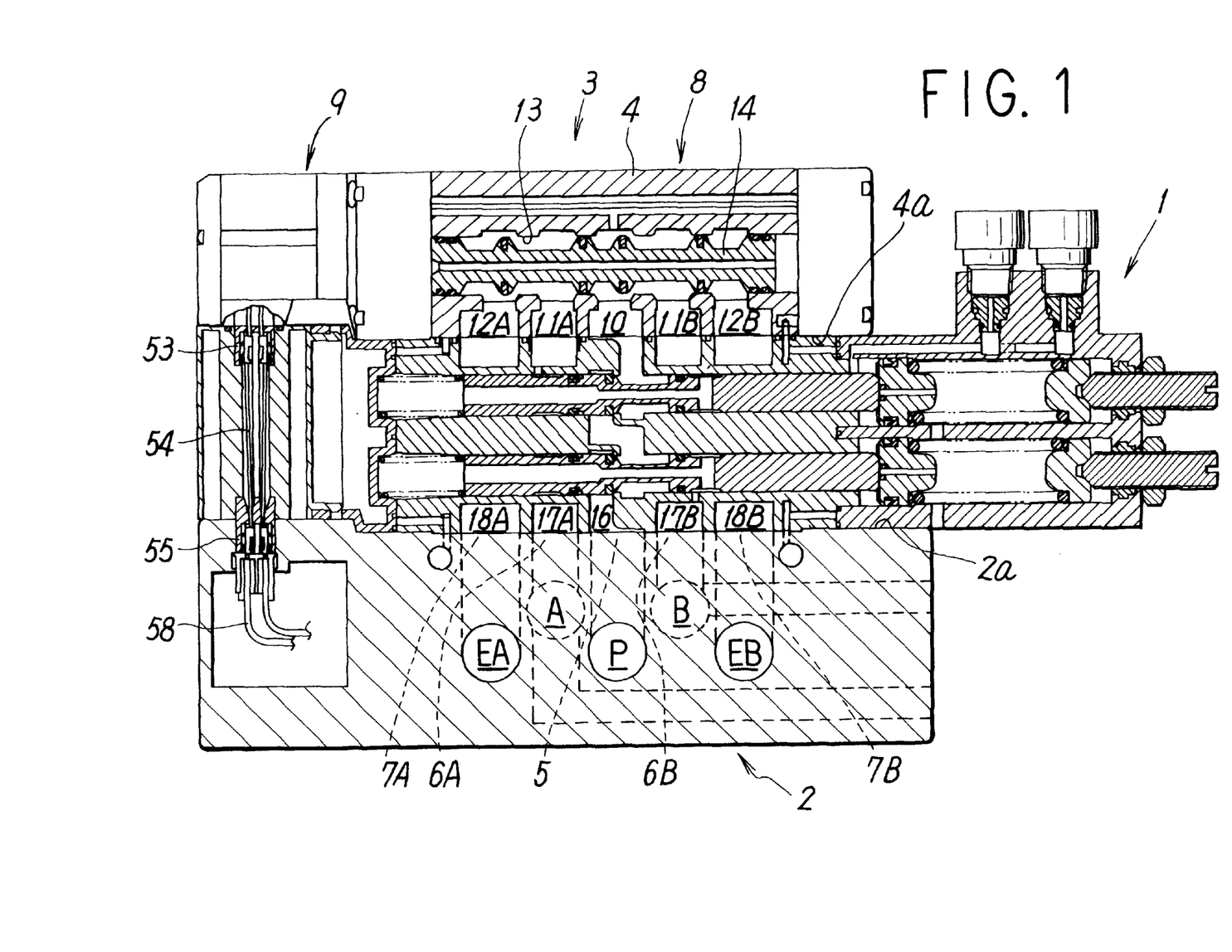
FIG. 1 is a sectional view showing a state in which a spacer type pressure reducing valve is mounted between a base and a solenoid valve according to a first embodiment of the invention.
Figure 2:
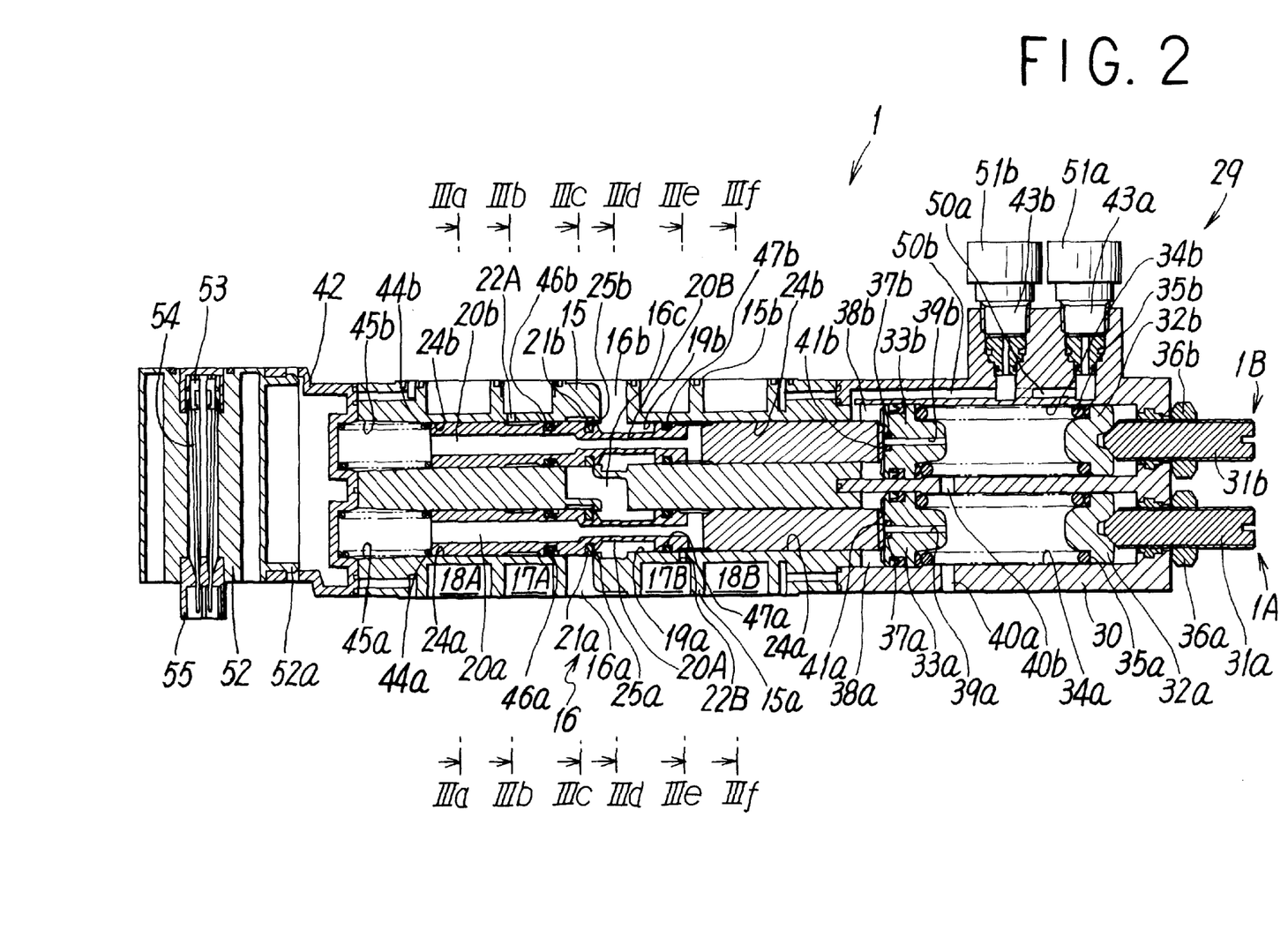
FIG. 2 is a sectional view of the spacer type pressure reducing valve of the first embodiment of the invention.

FIG. 1 is a sectional view showing a state in which a spacer type pressure reducing valve of a first embodiment of the invention is mounted between a base and solenoid valve. FIG. 2 is a sectional view for explaining details of the spacer type pressure reducing valve of the first embodiment. FIGS. 3(a) to (f) are sectional views taken along positions IIIa—IIIa to IIIf—IIIf in FIG. 2. FIG. 4 is a perspective view of a valve body of the first embodiment of the invention. FIG. 5 and subsequent drawings show a second embodiment.

In FIG. 1, a spacer type pressure reducing valve 1 is directly fixed between a base 2 and a solenoid valve 3 which is a switching valve by means of mounting means (not shown) such as mounting bolts or the like.

The base 2 is a member such as a manifold or sub-plate having a piping port, and capable of having one or more solenoid valves therein. The illustrated base 2 is a single type base having one solenoid valve 3.

The base 2 includes a supply flow passage P, a first discharge flow-passage EA and a second discharge flow-passage EB for pressurized fluid (compressed air) formed such as to pass through the base 2. The base 2 is formed with a first output port A and a second output port B opening at other side surface.

The base 2 is provided at its upper surface with a mounting surface 2a for a flat pressure reducing valve. In the mounting surface 2a and a supply communication hole 5 being respectively in communication with each flow passage and a port, a first output communication hole 6A and a second output communication hole 6B, a first discharge communication hole 7A and a second discharge communication hole 7B are opened in single file.

The solenoid valve 3 is a single or double type electromagnetically actuated switching valve having a main valve portion 8 and a pilot valve portion 9. The main valve portion 8 has a flat mounting surface 4a formed on a lower surface of the valve body 4. A supply communication hole 10, a first output communication hole 11A and a second output communication hole 11B, a first discharge communication hole 12A and a second discharge communication hole 12B are opened in single file in the mounting surface 4a. A valve hole 13 with which the above communication holes are in communication are formed in the valve body 4. A valve rod 14 for switching flow-paths is slidably and air-tightly inserted in the valve hole 13.

In the illustrated solenoid valve 3, if pilot pressure is output from the pilot valve portion 9 to the main valve portion 8 by excitation of solenoid, the valve rod 14 moves rightward as viewed in the drawing, the supply communication hole 10 and the first output communication hole 11A are brought into communication with each other, and the second output communication hole 11B and the second discharge communication hole 12B are brought into communication with each other. If the excitation of solenoid is released, pilot fluid in the main valve portion 8 is discharged, the valve rod 14 is returned into a state shown in the drawing by fluid pressure supplied to a chamber opposite from the pilot valve portion 9, thereby switching the state so that the supply communication hole 10 and the second output communication hole 11B are brought into communication with each other and the first output communication hole 11A and the first discharge communication hole 12A are brought into communication with each other.

Figure 3:
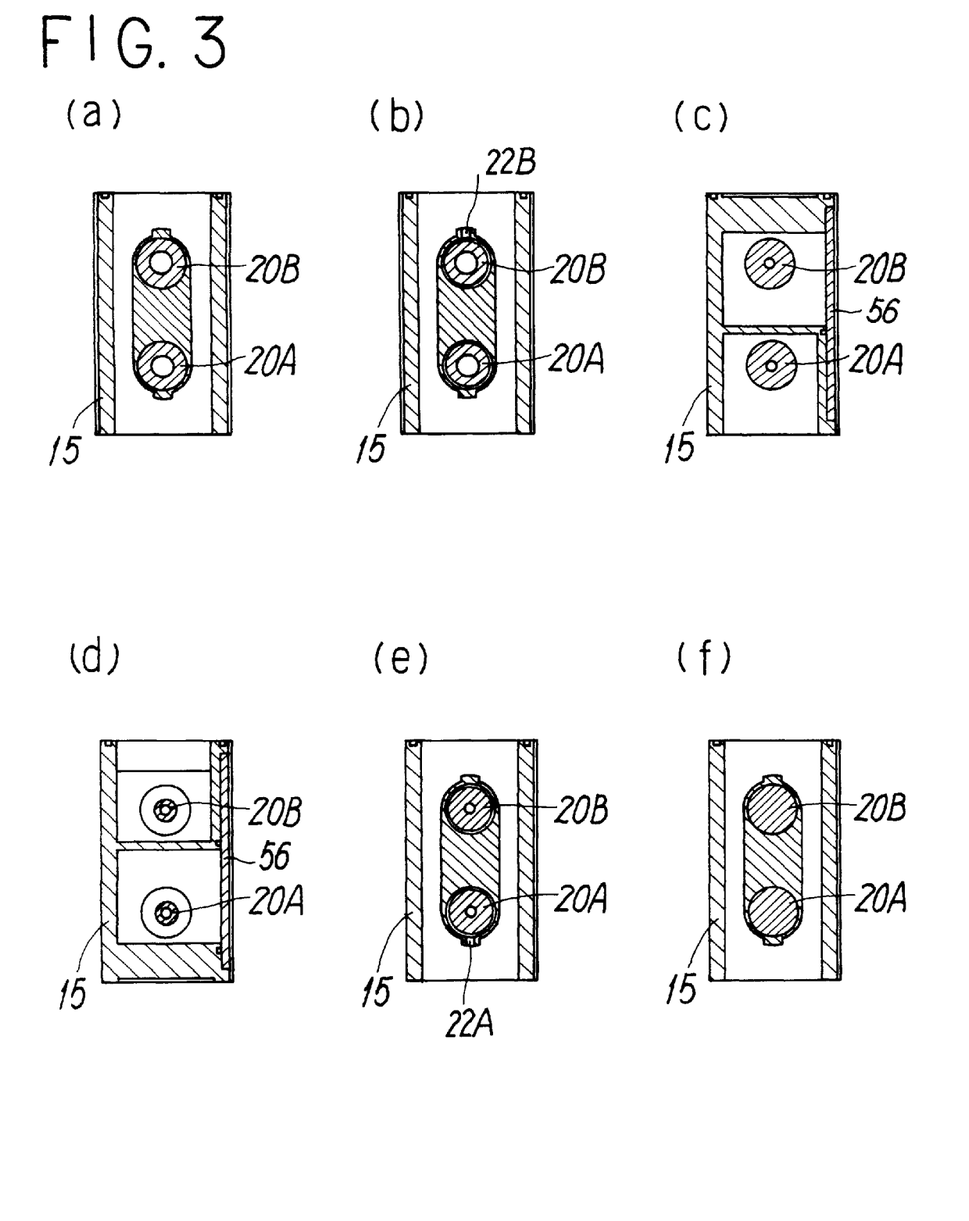
Figure 4:
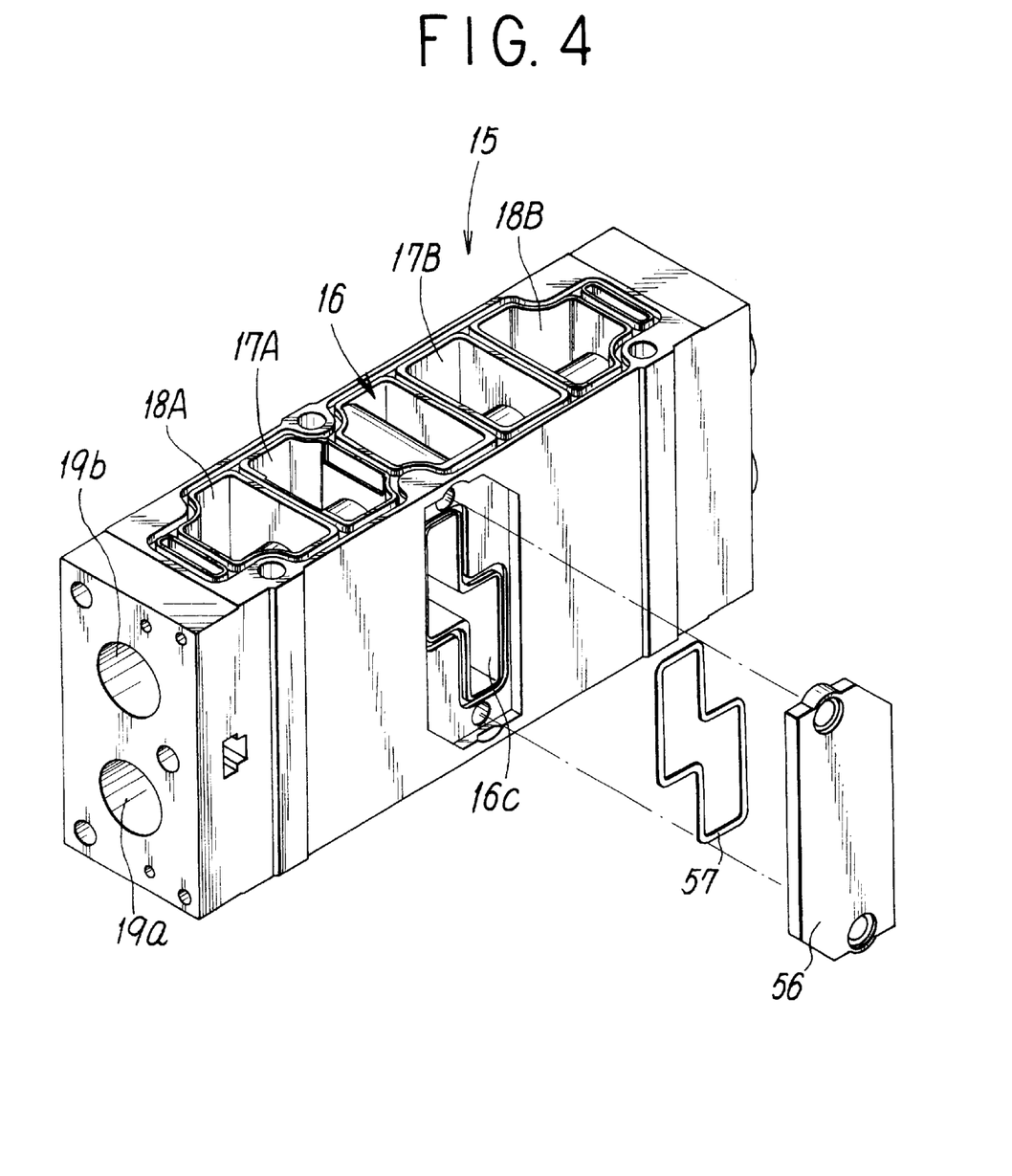
FIG. 4 is a perspective view of a valve body of the spacer type pressure reducing valve of the first embodiment of the invention.
Figure 5:
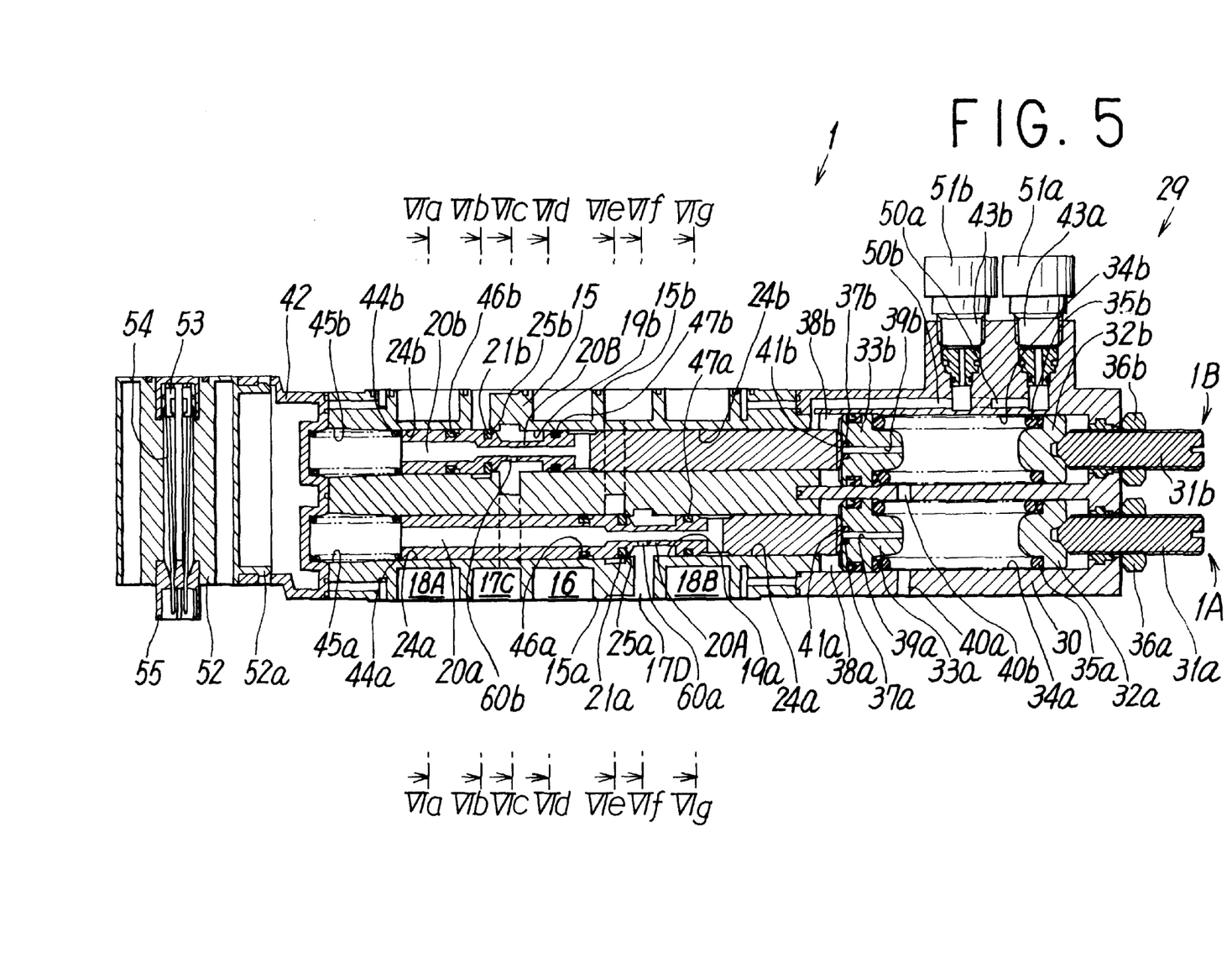
FIG. 5 is a sectional view of a spacer type pressure reducing valve of a second embodiment of the invention.

In FIGS. 2 to 4, the pressure reducing valve 1 includes a thin valve body 15 having rectangular cross section. A first pressure-reducing portion 1A and a second pressure-reducing portion 1B are superposed on each other and disposed in the valve body 15. Upper and lower surfaces of the valve body 15 are flat mounting surfaces 15a and 15b to which the base 2 and the solenoid valve 3 are to be mounted. By the mounting surfaces 15a and 15b, the pressure reducing valve 1 is directly sandwiched and mounted between the base 2 and the solenoid valve 3.

The first pressure-reducing portion 1A and the second pressure-reducing portion 1B in the valve body 15 are provided with a plurality of communication passages 16, 17A and 17B, 18A and 18B for connecting communication holes of the solenoid valve 3 and the base 2. The communication passages 16, 17A and 17B, 18A and 18B are opened on the upper and lower surfaces 15a and 15b in single file respectively. Pressure-adjusting valve holes 19a and 19b that are in parallel to the mounting surface are provided in a direction crossing the communication passages 16, 17A and 17B, 18A and 18B. In the pressure-adjusting valve holes 19a and 19b, pressure-adjusting valve rods 20A and 20B are respectively inserted movably.

The supplying communication passage 16 among the communication passages 16, 17A, 17B, 18A and 18B for connecting the supply communication hole 5 of the base 2 and the supply communication hole 10 of the solenoid valve 3 with each other is a communication passage which has pressure-adjusting valve seats 25a and 25b and which is capable of opening and closing. Outputting communication passages 17A and 17B for connecting first and second output communication holes 6A and 6B and first and second output communication holes 11A and 11B, and discharging communication passages 18A and 18B for connecting first and second discharge communication holes 7A and 7B and first and second discharge communication holes 12A and 12B are direct communication passages for connecting the communication holes straightly.

The supplying communication passage 16 comprises a first path-portion 16a which is in communication of the supply communication hole 5 on the side of the base 2 and opened at a pressure-adjusting valve hole 19a and a second path-portion 16b which is in communication with the supply communication hole 10 on the side of the solenoid valve 3 and opened at a pressure-adjusting valve hole 19b at a position slightly deviated in a lateral direction from the first path-portion 16a and a third path-portion 16c for bringing the first path-portion 16a and the second path-portion 16b into communication with each other. The pressure-adjusting valve seat 25a is provided on a portion of the pressure-adjusting valve hole 19a between the first path-portion 16a and the third path-portion 16c. The pressure-adjusting valve seat 25b is provided on a portion of the pressure-adjusting valve hole 19b between the second path-portion 16b and the third path-portion 16c. Opening between the first and third path-portions 16a and 16c, and opening between the second and third path-portions 16b and 16c are adjusted by pressure-adjusting valve bodies 21a and 21b respectively provided on the pressure-adjusting valve rods 20A and 20B.

The one output communication passage 17A is in communication with the pressure-adjusting valve hole 19b through the pressure intake hole 22A. The other output communication passage 17B is in communication with the pressure-adjusting valve hole 19a through the pressure intake hole 22B.

One end of the valve body 15 is formed with a pressure-adjusting portion 29. The pressure-adjusting portion 29 comprises pressure-adjusting chambers 38a and 38b formed between the valve body 15 and the pressure-adjusting side cover 30 such as to be in communication with the pressure-adjusting valve holes 19a and 19b respectively, and pressure-adjusting springs 35a and 35b provided between pressure-adjusting pistons 33a and 33b slidably accommodated in the pressure-adjusting chambers 38a and 38b and spring seats 32a and 32b disposed behind the pressure-adjusting pistons 33a and 33b in the spring chambers 34a and 34b. The pressure-adjusting springs 35a and 35b respectively bias the pressure-adjusting pistons 33a and 33b toward the pressure-adjusting valve rods 20A and 20B. Spring forces of the pressure-adjusting springs 35a and 35b can be adjusted by rotating adjusting screws 31a and 31b threadedly engauged in the end of the pressure-adjusting side cover 30 forward and backward. In the drawings, reference symbols 36a and 36b represent lock nuts for locking the adjusting screws 31a and 31b.

The pressure-adjusting pistons 33a and 33b are respectively provided with discharge holes 39a and 39b which bring the spring chambers 34a and 34b and breathing holes 40a and 40b formed in the pressure-adjusting side cover 30 into communication with each other to communicate with atmosphere. Ends of the discharge holes 39a and 39b are provided with relief valve members 37a and 37b. Valve-opening/closing portions 41a and 41b formed on tip ends of the pressure-adjusting valve rods 20A and 20B abut against the relief valve members 37a and 37b such that the valve-opening/closing portions 41a and 41b can be in contact or out of contact with respect to the relief valve members 37a and 37b so that the discharge holes 39a and 39b can be opened and closed.

Returning chambers 45a and 45b are formed on the other end of the valve body 15 between the valve body 15 and the returning-side cover 42. In the returning chambers 45a and 45b, returning springs 44a and 44b for biasing the pressure-adjusting valve rods 20A and 20B toward the pressure-adjusting pistons 33a and 33b are respectively provided. The biasing force of each of the returning springs 44a and 44b is set smaller than that of each of the pressure-adjusting springs 35a and 35b. As will be explained later, the returning chambers 45a and 45b are in communication with the pressure-adjusting chambers 38a and 38b through communication flow-passages for introducing pressure-adjusting pressurized fluid into pressure-adjusting chambers and returning chambers on the opposite ends of a pair of pressure-adjusting valve rods 20A and 20B.

The pressure-adjusting valve rods 20A and 20B have enough outer diameter to be inserted into the pressure-adjusting valve holes 19a and 19b, respectively. Pressure-introducing gaps 24a and 24b for communication flow-passages are respectively provided between outer peripheries of the pressure-adjusting valve rods 20A and 20B and the pressure-adjusting valve holes 19a and 19b.

Pressure-adjusting passages 20a and 20b which are respectively in communication with the returning chambers 45a and 45b are formed in the pressure-adjusting valve rods 20A and 20B. The pressure-adjusting passages 20a and 20b formed the communication flow-passages together with the pressure-introducing gaps 24a and 24b, and respectively bring the returning chambers 45a and 45b and pressure-adjusting chambers 38a and 38b into communication with each other.

Therefore, the communication passage 17A and the returning chamber 45b are in communication with each other through the pressure intake hole 22A and the pressure-introducing gap 24b. The communication passage 17B and the pressure-adjusting chamber 38a are in communication with each other through the pressure intake hole 22B and the pressure-introducing gap 24a.

The pressure-introducing gaps 24a and 24b around the pressure-adjusting valve rods 20A and 20B on the opposite sides of the communication passage 16 are sealed by seal members 46a and 47a and seal members 46b and 47b respectively provided on the pressure-adjusting valve rods 20A and 20B.

The pressure-adjusting chambers 38a and 38b are in communication with detection ports 43a and 43b provided in pressure-adjusting side cover 30 through connection passages 50a and 50b so that adjusting air pressure of the pressure-adjusting chambers 38a and 38b can be detected by pressure gauges 51a and 52b mounted to the detection ports 43a and 43b. In this case, the pressure gauges 51a and 51b are disposed in the vicinity of the pair of adjusting screws 31a and 31b so that operability of the adjusting screws 31a and 31b is enhanced.

A housing 52 is retained and fixed to an end of the returning-side cover 42 through a pawl 52a. First and second electric connectors 53 and 55 which are respectively connected to the base 2 and the pilot valve portion 9 of the solenoid valve 3 electrically are provided in the housing 52. The first electric connector 53 and the second electric connector 55 are electrically connected to each other through an electric conductor 54. The second electric connector 55 is connected to a power source through a feeder line 58.

FIG. 4 shows opening ends of the communication passages 16, 17A, 17B, 18A and 18B formed in the valve body 15, and a state in which the third path-portion 16c in the communication passage 16 is formed from a side surface of the valve body 15. An opening which is necessary to form the third path-portion 16c is sealed by a plate 56 through a gasket 57, or sealed by directly welding the plate 56 to the opening end.

Next, operation of the spacer type pressure reducing valve having the above structure will be explained.

First, when pressurized fluid, e.g., compressed air is not supplied to the supply flow passage P of the base 2, since the biasing forces of the pressure-adjusting springs 35a and 35b are greater than those of the returning springs 44a and 44b, the pressure-adjusting pistons 33a and 33b and the pressure-adjusting valve rods 20A and 20B move leftward as viewed in FIG. 2, the pressure-adjusting valve bodies 21a and 21b open the pressure-adjusting valve seats 25a and 25b, the supply flow passage P of the base 2 and the supply communication hole 10 of the solenoid valve 3 are brought into communication with each other through the first, second and third path-portions 16a, 16b and 16c of the communication passage 16.

If the pressurized fluid is supplied to the supply flow passage P of the base 2 and the communication passage 16 of the pressure reducing valve 1 and the communication passage 17B are brought into communication with each other through the solenoid valve 3 and the communication passage 17A and the communication passage 18A are brought into communication with each other, the pressurized fluid passes through the pressure intake hole 22B and the pressure-introducing gap 24a via the communication passage 17B and is introduced into the pressure-adjusting chamber 38a and at the same time, the pressurized fluid passes through the pressure-adjusting passage 20a and is introduced into the returning chamber 45a. Therefore, the pressure-adjusting valve body 21a opens and closes the pressure-adjusting valve seat 25a with opening in accordance with a difference between a biasing force of the pressure-adjusting spring 35a and a combination force of a fluid pressure acting force acting on the pressure-adjusting piston 33a and a biasing force of the returning spring 44a. In this state, the communication passage 17A is in communication with the second discharge flow-passage EB through the communication passage 18A. Therefore, pressurized fluid in the pressure-adjusting chamber 38b and the returning chamber 45b flows out from the pressure intake hole 22A into the communication passage 17A through the pressure-introducing gap 24b. Thus, the pressure-adjusting valve body 21b is maintained in a state in which the pressure-adjusting valve seat 25b is opened by the biasing force of the pressure-adjusting spring 35b.

During a time period in which the combined force of the fluid pressure acting force acting on the pressure-adjusting piston 33a and the biasing force of the returning spring 44a is smaller than the biasing force of the pressure-adjusting spring 35a in a state in which the pressurized fluid from the supply flow passage P is introduced into the pressure-adjusting chamber 38a and the returning chamber 45a, the pressure-adjusting piston 33a together with the pressure-adjusting rod 20A move leftward, the pressure-adjusting valve body 21a opens the pressure-adjusting valve seat 25a, and in accordance with the opening, pressurized fluid is out put to the second output port B. The fluid pressure in the output port B is increased to the set pressure, and if the combined force of the fluid pressure acting force acting on the pressure-adjusting piston 33a and the biasing force of the returning spring 44a becomes equal to the biasing force of the pressure-adjusting spring 35a, the pressure-adjusting valve body 21a closes the pressure-adjusting valve seat 25a and thus, the pressure of the pressurized fluid supplied from the supply flow passage P to the second output port B is maintained at the set pressure.

In a state in which the pressure-adjusting valve body 21a closes the pressure-adjusting valve seat 25a, if the pressure of the fluid pressure in the second output port B is further increased, and in the fluid pressure acting force acting on the pressure-adjusting piston 33a from the communication passage 17B becomes greater than the biasing force of the pressure-adjusting spring 35a, the pressure-adjusting piston 33a moves rightward as viewed in the drawing, and the relief valve member 37a is opened.

With this, the pressurized fluid in the pressure-adjusting chamber 38a is discharged outside through the discharge hole 39a and the breathing hole 40a. Therefore, the balance between the fluid pressure acting force and the biasing force of the pressure-adjusting spring 35a is maintained, and the fluid pressure in the second output port B is adjusted to a pressure set by the pressure-adjusting spring 35a.

The fluid pressure in the second output port B is detected by a pressure gauge 51a mounted in the detection port 43a. The fluid pressure is set by threadedly rotating the pressure-adjusting screw 31a to move the same forward or backward to adjust a resilient force of the pressure-adjusting spring 35a.

Next, if the communication passage 16 of the pressure reducing valve 1 and the communication passage 17A are brought into communication with each other through the solenoid valve 3, and the communication passage 17B and the communication passage 18B are brought into communication with each other, pressurized fluid in the pressure-adjusting chamber 38a and the returning chamber 45a is discharged out from the second discharge flow-passage EB from the pressure-adjusting passage 20a and the pressure-introducing gap 24a through the pressure intake hole 22B and the communication passages 17B and 18B.

With this, fluid pressure in the pressure-adjusting chamber 38a and the returning chamber 45a is lowered, the pressure-adjusting rod 20A moves leftward as viewed in the drawing by the biasing force of the pressure-adjusting spring 35a, and the pressure-adjusting valve body 21a opens the pressure-adjusting valve seat 25a.

The pressurized fluid in the supply flow passage P is introduced into the pressure-adjusting chamber 38b and the returning chamber 45b respectively through the pressure intake hole 22A, the pressure-adjusting passage 20b and the pressure-introducing gap 24b from the communication passage 17A. The pressurized fluid in the communication passage 17A is supplied to the fluid pressure device from a first output port A of the base 2.

During a time period in which the combined force of the fluid pressure acting force acting on the pressure-adjusting piston 33b and the biasing force of the returning spring 44b is smaller than the biasing force of the pressure-adjusting spring 35b, the pressure-adjusting valve rod 20B moves leftward, the pressure-adjusting valve body 21b opens the pressure-adjusting valve seat 25b, and the fluid pressure in the first output port A is increased to the set pressure. When the combined force of the fluid pressure acting force acting on the pressure-adjusting piston 33b and the biasing force of the returning spring 44b becomes greater than the biasing force of the pressure-adjusting spring 35b, the pressure-adjusting valve rod 20B moves rightward, the pressure-adjusting valve body 21b closes the pressure-adjusting valve seat 25b, and the fluid pressure of the first output port A is maintained at the set pressure.

As described above, if the fluid pressure of the first output port A becomes high in the state in which the pressure-adjusting valve body 21b closed the pressure-adjusting valve seat 25b, the pressure-adjusting piston 33b moves rightward as viewed in the drawing, the relief valve member 37b is opened, the pressurized fluid in the pressure-adjusting chamber 38b is discharged out through the discharge hole 39b and the breathing holes 40a and 40b, and the fluid pressure in the first output port A is adjusted to a pressure set by the pressure-adjusting spring 35b.

The fluid pressure of the first output port A is detected by a pressure gauge 51b mounted to the detection port 43b, and setting of the fluid pressure is changed by advancing/retracting the pressure-adjusting screw 31b to adjust the resilient force of the pressure-adjusting spring 35.

Figure 6:
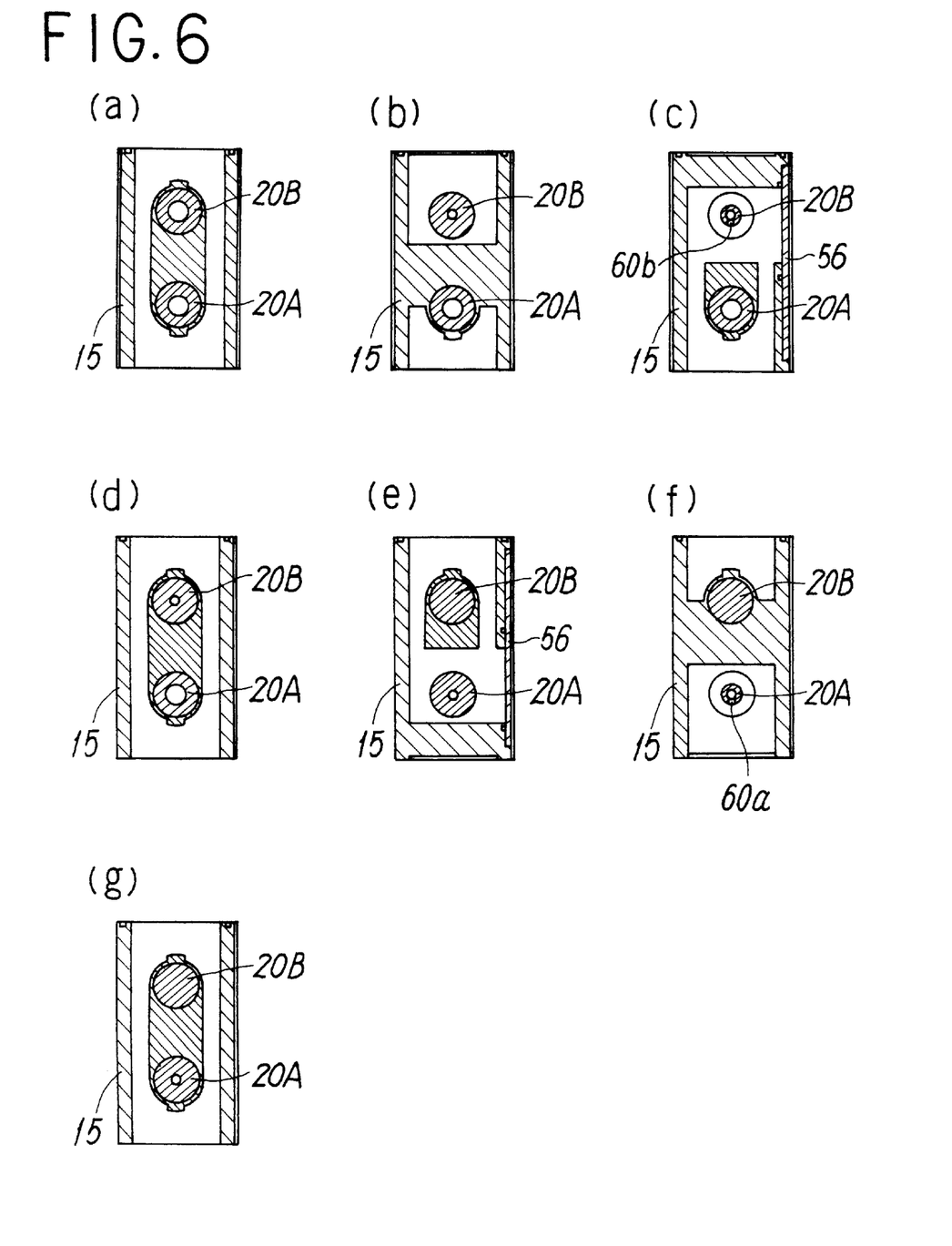

FIG. 5 is a sectional view of a second embodiment of the spacer type pressure reducing valve according to the present invention, and FIGS. 6 (a) to (g) are sectional views taken along VIa—VIa to VIg—VIg in FIG. 5 positions.

In the spacer type pressure reducing valve of the first embodiment shown in FIGS. 1 to 3, the communication passage 16 which is in communication with the supply communication hole 10 of the solenoid valve 3 is provided with the pressure-adjusting valve seats 25a and 25b, and their openings are adjusted by the pressure-adjusting valve bodies 21a and 21b. Whereas, in the second embodiment, a communication passage which is in communication with an output communication hole of the solenoid valve 3 is provided with a pressure-adjusting valve seat and a pressure-adjusting valve body for adjusting its opening.

That is, in this second embodiment, a communication passage 17C connecting the first output communication hole 11A of the solenoid valve 3 and the first output port A of the base 2 is brought into communication with the pressure-adjusting valve hole 19b, and the communication passage 17D connecting the second output communication hole 11B the solenoid valve 3 and the second output port B of the base 2 is brought into communication with the pressure-adjusting valve hole 19a, so that the communication passages 17C and 17D can function as pressure-adjusting communication passages which are independently opened and closed by the pressure-adjusting valve bodies 21a and 21b and the pressure-adjusting valve seats 25a and 25b, and the communication passage 16 is formed into a direct-communication passage for directly bringing the supply communication hole 10 of the solenoid valve 3 and the supply flow passage P of the base 2 into communication with each other. In a communication passage 17C extending from the pressure-adjusting valve seat 25b to the first output port A of the base 2, a pressure intake hole 60b for introducing fluid pressure of the communication passage 17C to the pressure-adjusting passage 20b is provided in the pressure-adjusting valve rod 21B. In a communication passage 17D extending from the pressure-adjusting valve seat 25a to the second output port B of the base 2, a pressure intake hole 60a for introducing the fluid pressure of the communication passage 17D to the pressure-adjusting passage 20a is provided in the pressure-adjusting valve rod 21A.

Other structure is the same as that of the spacer type pressure reducing valve shown in FIG. 2 and thus, detailed explanation will be omitted.

In the spacer type pressure reducing valve of the second embodiment, like the first embodiment, when the pressurized fluid is not supplied to the supply flow passage P of the base 2, the pressure-adjusting pistons 33a and 33b and the pressure-adjusting valve rods 20A and 2B move leftward as viewed in the drawing, and the pressure-adjusting valve bodies 21a and 21b open the pressure-adjusting valve seats 25a and 25b.

If the communication passages 16 and 17d of the pressure reducing valve 1 are brought into communication with each other and the communication passages 17C and 18A are brought into communication with each other by the solenoid valve 3 in a state in which the pressurized fluid is supplied to the supply flow passage P, the pressurized fluid is introduced into the pressure-adjusting chamber 38a and the returning chamber 45a through the pressure intake hole 60a, the pressure-adjusting passage 20a and the pressure-introducing gap 24a by the communication passage 17D, and is supplied to the fluid pressure device by the communication passage 17D through the second output port B of the base 2.

In this case, an opening of the pressure-adjusting valve seat 25a is adjusted in accordance with a difference between the biasing force of the pressure-adjusting spring 35a and the combined force of the fluid pressure acting force acting on the pressure-adjusting piston 33a and the returning spring 44a. The pressurized fluid supplied to the supply flow passage P is reduced to a pressure set by the pressure-adjusting spring 35a, and is supplied to the second output port B.

If the combined force of the fluid pressure acting force acting on the pressure-adjusting piston 33a and the returning spring 44a becomes greater than the biasing force of the pressure-adjusting spring 35a, the pressure-adjusting rod 20A moves rightward, the pressure-adjusting valve body 21a closes the pressure-adjusting valve seat 25a, and the fluid pressure of the second output port B is maintained at the set pressure. If the fluid pressure of the communication passage 17D becomes higher than the set pressure in a state in which the pressure-adjusting valve body 21a closed the pressure-adjusting valve seat 25a, the pressure-adjusting piston 33a moves rightward as viewed in the drawing, and the relief valve member 37a is opened.

With this, the pressurized fluid of the pressure-adjusting chamber 38a is discharged out through the discharge hole 39a and the breathing hole 40a, and the fluid pressure of the second output port B is adjusted to a pressure set by the pressure-adjusting spring 35a.

Next, if the communication passages 16 and 17C of the pressure reducing valve 1 are brought into communication with each other and the communication passages 17D and 18B are brought into communication with each other by the solenoid valve 3, the pressurized fluid of the pressure-adjusting chamber 38a and the returning chamber 45a are discharged from the second discharge flow-passage EB through the pressure-adjusting passage 20a, the pressure-introducing gap 24a, the communication passages 17D and 18B, the fluid pressure of the pressure-adjusting chamber 38a and the returning chamber 45a is reduced, and the pressure-adjusting valve body 21a opens the pressure-adjusting valve seat 25a.

The pressurized fluid from the supply flow passage P is introduced into the pressure-adjusting chamber 38b and the returning chamber 45b through the pressure-adjusting passage 20b and the pressure-introducing gap 24b by the communication passage 17C, and is supplied to the fluid pressure device by the first output port A of the base 2.

If the combined force of the fluid pressure acting force acting on the pressure-adjusting piston 33b and the returning spring 44b becomes greater than the biasing force of the pressure-adjusting spring 35b, the pressure-adjusting rod 20B moves rightward, the pressure-adjusting valve body 21b closes the pressure-adjusting valve seat 25b, and the fluid pressure of the first output port A is maintained at the set pressure.

If high fluid pressure flows into the communication passage 17C in a state in which the pressure-adjusting valve body 21b closed the pressure-adjusting valve seat 25b, the pressure-adjusting piston 33b moves rightward as viewed in the drawing, the relief valve member 37b is opened, the pressurized fluid of the pressure-adjusting chamber 38b is discharged out through the discharge hole 39b and the breathing hole 40a, and the fluid pressure of the first output port A is adjusted to a pressure set by the pressure-adjusting spring 35b.

In the spacer type pressure reducing valve of each of the above embodiments, since the first and second pressure-reducing portion 1A and 1B are disposed in the valve body 15 and the first and second pressure-reducing portion 1A and 1B are integrally formed as one body, the structure is made compactly, and a size thereof can be reduced.

Although the embodiments of the spacer type pressure reducing valve of the present invention have been described in detail above, the invention is not limited to the spacer type pressure reducing valve of the embodiments, and the invention can variously be varied within a range not departing from spirit of the invention described in claims.

As understood from the above explanation, according to the spacer type pressure reducing valve of the present invention, since the two pressure-reducing portions are integrally disposed in the valve body, the structure is made compact, and the size thereof can be reduced. Therefore, this is effective for a manifold type in which a plurality of switching valves are mounted in the base. Further, since the pressure gauge is disposed in the vicinity of the adjusting screw, it is possible to enhance the operability of pressure setting of the output port.

What is claimed is:

1. A spacer type pressure reducing valve which adjusts an output fluid pressure and which is disposed between a switching valve having one supply communication hole, two output communication holes and a discharge communication hole and a base having a plurality of communication holes corresponding to the above communication holes, wherein this spacer type pressure reducing valve comprises a valve body sandwiched between the switching valve and the base;

two pressure-adjusting valve holes formed in the valve body in parallel to each other, and two pressure-adjusting valve rods movably accommodated in the pressure-adjusting valve holes;

one supply communication passage for connecting supply communication holes in the valve body corresponding to the switching valve and the base, and two output communication passages for connecting the corresponding output communication holes, and two discharge communication passages for connecting corresponding discharge communication holes;

a pressure-adjusting valve seat and a pressure-adjusting valve body formed in one of the pressure-adjusting valve holes and a pressure-adjusting valve rod therein for adjusting the fluid pressure output from one of the output communication passages, and another pressure-adjusting valve seat and another pressure-adjusting valve body formed in the other pressure-adjusting valve hole and a pressure-adjusting valve rod therein for adjusting fluid pressure output from the other output communication passage;

pressure-adjusting chambers respectively provided on one ends of the two pressure-adjusting valve rods, and returning chambers respectively provided on the other ends of the pressure-adjusting valve rods;

pressure-adjusting pistons slidably provided in the pressure-adjusting chambers;

pressure-adjusting springs for biasing the pressure-adjusting pistons toward the pressure-adjusting valve rods;

returning springs respectively provided in the returning chambers for biasing the pressure-adjusting valve rods toward the pressure-adjusting pistons;

a communication flow-passage for connecting the pressure-adjusting chamber and the returning chamber on the opposite ends of the one output communication passage and the one pressure-adjusting valve rod, and a communication flow-passage for connecting the pressure-adjusting chamber and the returning chamber on the opposite ends of the other output communication passage and the other pressure-adjusting valve rod.

2. A spacer type pressure reducing valve according to claim 1, wherein the pressure-adjusting piston includes a discharge hole for discharging out the pressurized fluid in the pressure-adjusting chamber, and the pressure-adjusting valve rod is provided-at its end with an opening/closing portion for opening and closing the discharge hole.

3. A spacer type pressure reducing valve according to claim 1, wherein the valve body is provided at its end closer to the pressure-adjusting chamber with two adjusting screws capable of independently adjusting resilient forces of the two pressure-adjusting springs, and two pressure gauges for independently detecting fluid pressures of the two pressure-adjusting chambers.

4. A spacer type pressure reducing valve according to claim 1, wherein the communication flow-passage comprises a pressure-adjusting passage formed in the pressure-adjusting valve rod and brought into communication with the returning chamber, a pressure-introducing gap formed between the pressure-adjusting valve hole and the pressure-adjusting valve rod for connecting the pressure-adjusting passage and the pressure-adjusting chamber, and a pressure intake hole for bringing the returning chamber or the pressure-adjusting passage and the output communication passage.

5. A spacer type pressure reducing valve according to claim 1, wherein the supply communication passage in the valve body extends through portions of the two pressure-adjusting valve holes, the pressure-adjusting valve seats are formed on positions through which the supply communication passages of the pressure-adjusting valve holes pass.

6. A spacer type pressure reducing valve according to claim 1, wherein the two output communication passages in the valve body respectively extend through the two pressure-adjusting valve holes, the pressure-adjusting valve seats are formed on positions through which the output communication passages of the pressure-adjusting valve holes pass.

7. A spacer type pressure reducing valve according to claim 5, wherein the pressure-adjusting piston includes a discharge hole for discharging out the pressurized fluid in the pressure-adjusting chamber, the pressure-adjusting valve rod is provided at it send with a opening/closing portion for opening and closing the discharge hole, the valve body is provided at its end closer to the pressure-adjusting chamber with two adjusting screws capable of independently adjusting resilient forces of the two pressure-adjusting springs and two pressure gauges for independently detecting the fluid pressure of the two pressure-adjusting chambers, the communication flow-passage comprises a pressure-adjusting passage formed in the pressure-adjusting valve rod and brought into communication with the returning chamber, a pressure-introducing gap formed between the pressure-adjusting valve hole and the pressure-adjusting valve rod for connecting the pressure-adjusting passage and the pressure-adjusting chamber, and a pressure intake hole for bringing the returning chamber or the pressure-adjusting passage and the output communication passage into communication with each other.

8. A spacer type pressure reducing valve according to claim 6, wherein the pressure-adjusting piston includes a discharge hole for discharging out the pressurized fluid in the pressure-adjusting chamber, the pressure-adjusting valve rod is provided at its end with an opening/closing portion for opening and closing the discharge hole, the valve body is provided at its end closer to the pressure-adjusting chamber with two adjusting screws capable of independently adjusting resilient forces of the two pressure-adjusting springs and two pressure gauges for independently detecting fluid pressure of the two pressure-adjusting chambers, the communication flow-passage comprises a pressure-adjusting passage formed in the pressure-adjusting valve rod and brought into communication with the returning chamber, a pressure-introducing gap formed between the pressure-adjusting valve hole and the pressure-adjusting valve rod for connecting the pressure-adjusting passage and the pressure-adjusting chamber, and a pressure intake hole for bringing the returning chamber or the pressure-adjusting passage and the output communication passage into communication with each other.

* * * * *